Figure 1:
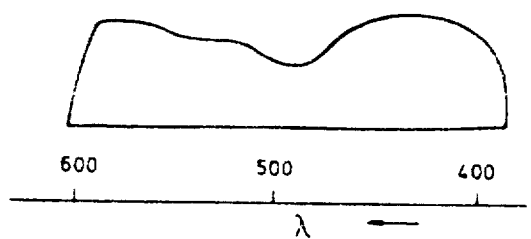
Figure 2:
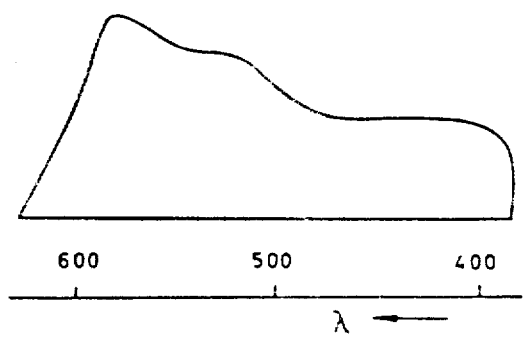
Figure 3:
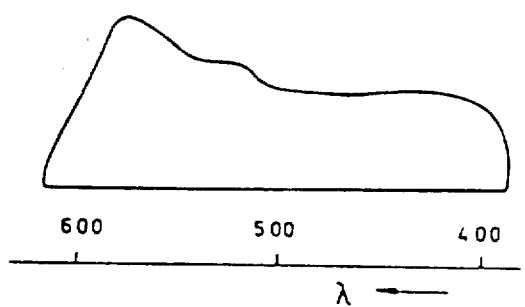
Figure 4:
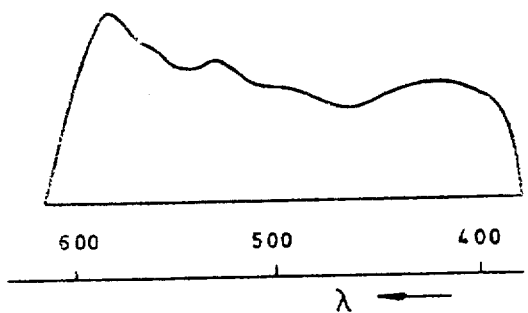
Figure 5:
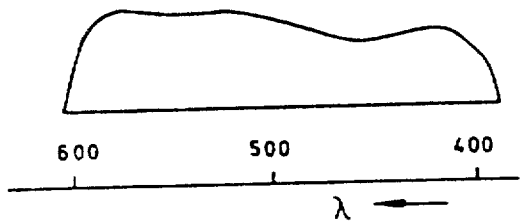
Figure 6:
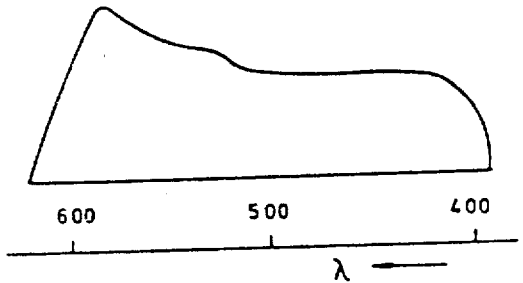
Figure 7:
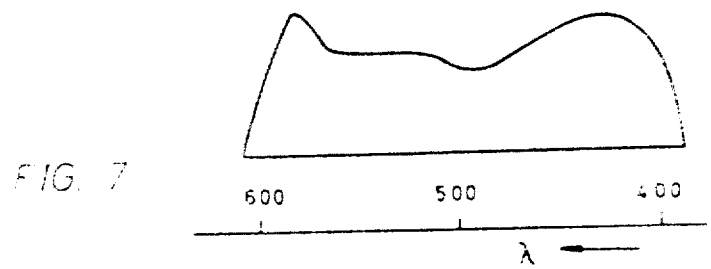
Figure 8:
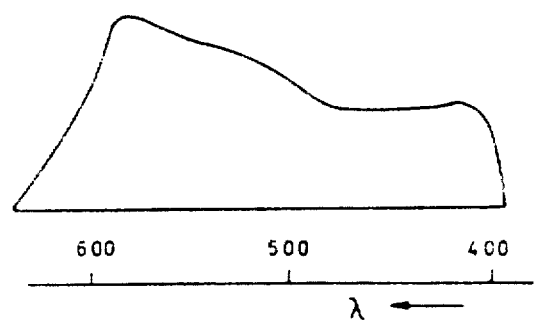
Figure 9:
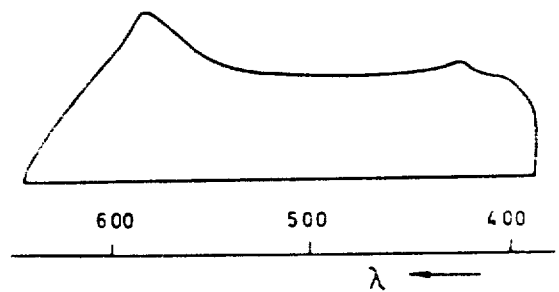
Figure 10:
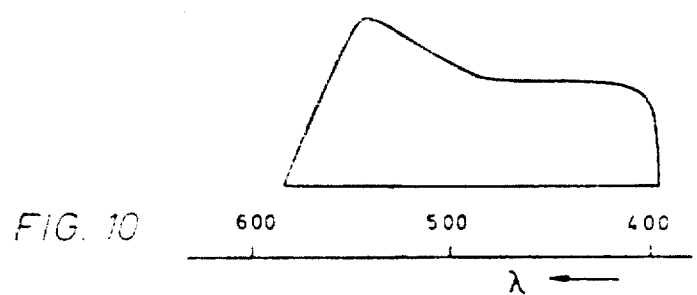
Figure 11:
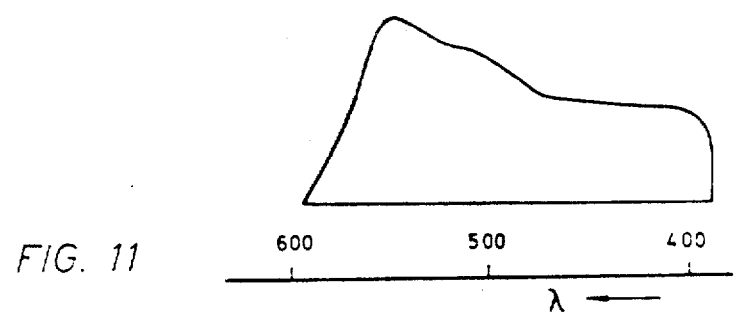
Figure 12:
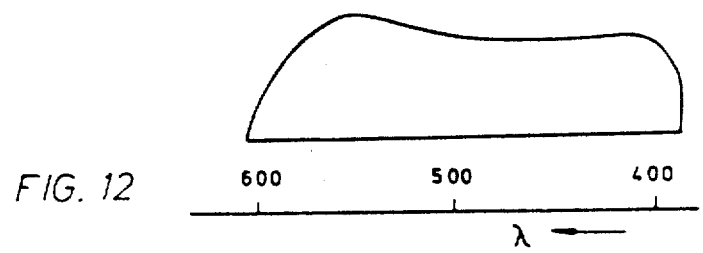
Figure 13:
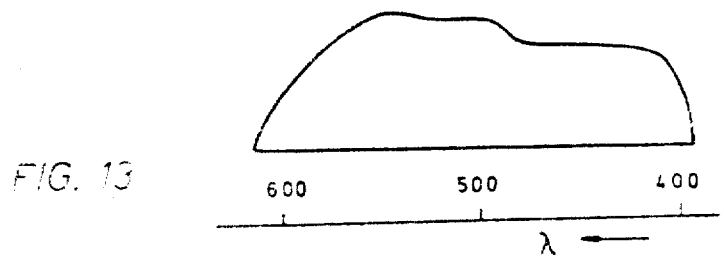
Figure 14:
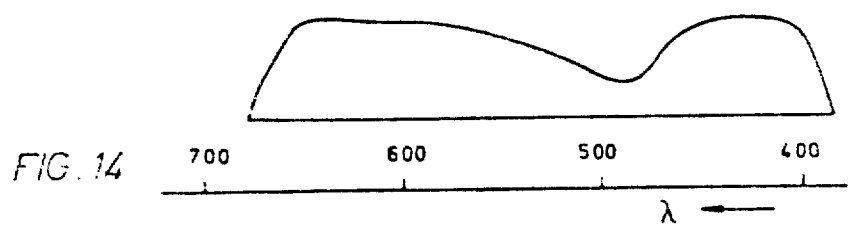
Figure 15:
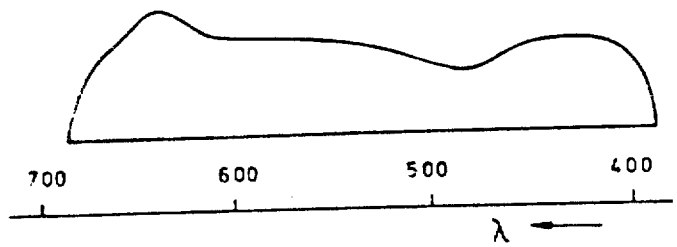
Figure 16:
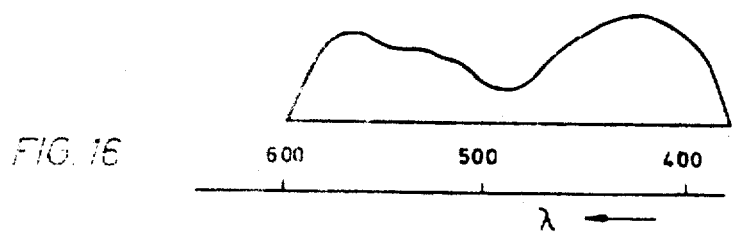
Figure 17:
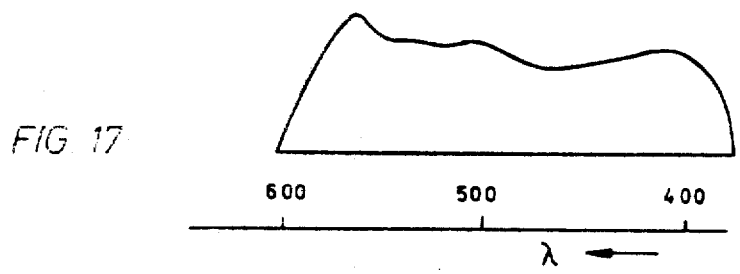
Figure 18:
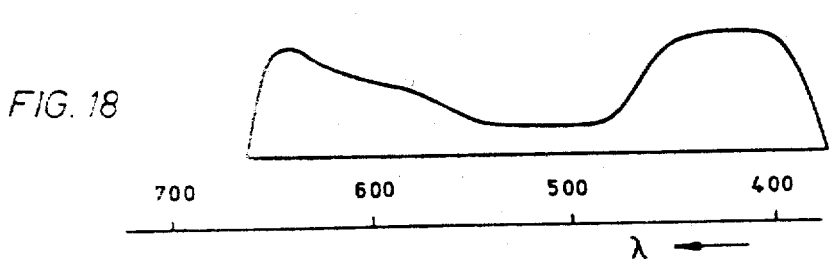
Figure 19:
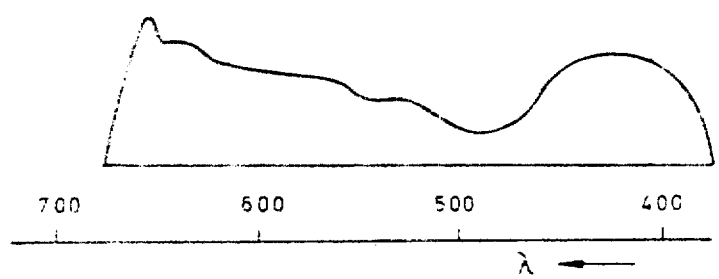
Figure 20:
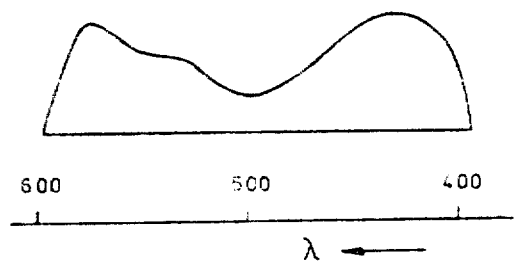
Figure 21:
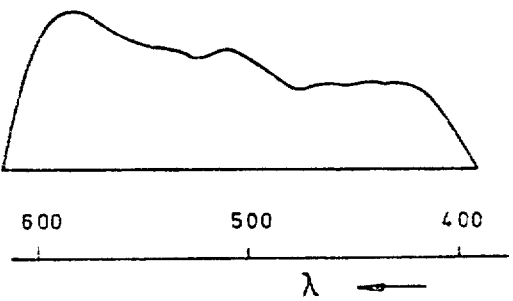
Figure 22:
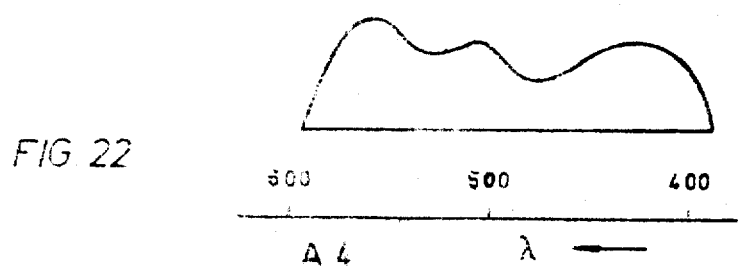
Figure 23:
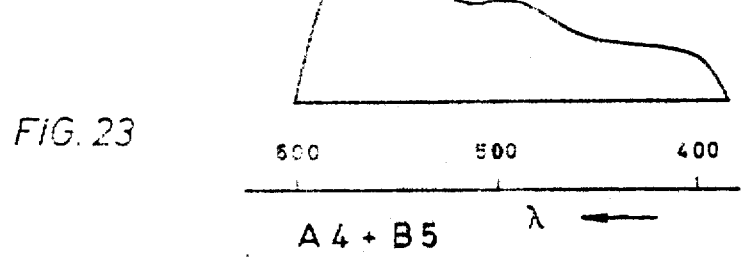

United States Patent [19]

Moisar et al.

[11] 3,885,972
[45] May 27, 1975

[54] SUPERSENSITIZED DIRECT POSITIVE PHOTOGRAPHIC SILVER SALT EMULSIONS

[75] Inventors: Erik Moisar, Cologne; Oskar Riester, Leverkusen, both of Germany

[73] Assignee: Agfa-Gevaert Aktiengesellschaft, Leverkusen-Bayerwerk, Germany

[22] Filed: Dec. 18, 1972

[21] Appl. No.: 316,048

[30] Foreign Application Priority Data
Dec. 22, 1971 Germany.......................... 2163676

[52] U.S. Cl. ..................... 96/126; 96/129; 96/107; 96/108
[51] Int. Cl. ........ G03c 1/10; G03c 1/24; G03c 1/26
[58] Field of Search ............. 96/108, 101, 126, 129

[56] References Cited
UNITED STATES PATENTS

| 2,316,268 | 9/1945 | Mareis ................................ 96/126 |
| 2,423,710 | 7/1947 | Knott.................................. 96/126 |
| 2,533,426 | 12/1960 | Carroll et al......................... 96/126 |
| 3,501,306 | 3/1970 | Illingsworth ......................... 96/101 |
| 3,501,311 | 3/1970 | Lincoln et al........................ 96/101 |
| 3,772,033 | 11/1973 | Ficken et al......................... 96/126 |

OTHER PUBLICATIONS

Moisar et al., Bunsenges Phys. Chemie 67, 1963, 356-359.
Gilman, Jr.; Photographic Science and Engineering, Vol. 12, 10/68, pp. 237-239.

*Primary Examiner*—Ronald H. Smith
*Assistant Examiner*—J. P. Brammer
*Attorney, Agent, or Firm*—Connolly and Hutz

[57] ABSTRACT

The light-sensitivity of a photographic material containing at least one direct positive silver salt emulsion layer the silver salt grains of said emulsion contain electron traps, can be improved by adding a sensitizing dye capable of being super-sensitized, and in addition a supersensitizing styryl dye.

4 Claims, 25 Drawing Figures

A 4

A 4 + B 5

A 1

A1 + B1

SUPERSENSITIZED DIRECT POSITIVE PHOTOGRAPHIC SILVER SALT EMULSIONS

This invention relates to a photographic material with at least one spectrally sensitized direct positive silver salt emulsion layer which contains substances with a super-sensitizing effect.

The sensitizing effect of sensitizers in silver halide emulsions can be enhanced by the addition of certain compounds which do not themselves absorb light in the spectral region in question and are therefore not sensitizers. It is known that when the exposure of a photographic emulsion to light, in the absorption range of the sensitizing dye adsorbed on the silver halide, is carried out in the presence of the compounds known as supersensitizers, the photoconductivity in the silver halide is increased and hence the formation of a latent image is promoted. It is, however, also known that supersensitizers are effective positive hole traps and are therefore capable of suppressing the oxidation of latent image nuclei by the positive hole of the dye present after the act of sensitization (P. B. Gilman Jr., Phot.Sci.Eng. 12 (1968), 230). Both mechanisms give rise to increased formation of latent silver nuclei and explain the increase in sensitivity of photographic negative emulsions.

In contradistinction to the mechanism in negative emulsions, the mechanism in photographic direct reversal emulsions is based on the imagewise destruction of the developable fog nuclei by the positive holes produced on exposure to light. Such direct reversal emulsions have been known for a long time. In order to prevent the competing formation of latent image nuclei on the crystal surfaces of such direct-reversal photographic emulsions and to ensure that the positive holes which cause imagewise destruction of the superficial fog nuclei are not eliminated by electrons, these emulsions may be provided with electron acceptors, e.g. with electron traps in the interior of the silver halide crystals or with desensitizers situated adsorptively on the surface, the sensitivity being thereby increased (E. MOISAR and S. WAGNER, Ber. Bunsenges. Phys. Chemie 67 (1963) 356). In principle, these direct reversal emulsions make use of the solarisation effect.

It is among the objects of this invention to provide direct positive photographic silver salt emulsions which have increased sensitivity to light.

We now have found a photographic material containing at least one optically sensitized direct positive silver salt emulsion layer the silver salt grains of said emulsion contain electron traps in which the silver salt emulsion has been sensitized with optical sensitizing dyes which are capable of being supersensitized and contains supersensitizing styryl compounds.

Any spectral sensitizers capable of being supersensitized can be used for the emulsion according to the invention. Compounds of this kind have been described e.g. by F. M. HAMER in "The Cyanine Dyes and related Compounds," Interscience Publishers a division of John Wiley and Sons, New York, 1964.

Symmetrical or asymmetric cyanine dyes of the following formula:

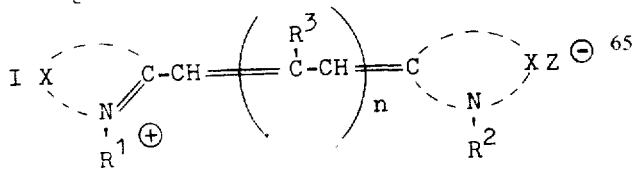

have proved to be particularly suitable. In the above formula,

X represents the ring members required for completing a benzoxazole, benzothiazole, benzoselenazole or quinoline ring, which may be substituted, e.g. benzothiazole, 4-chlorobenzothiazole, 5-chlorobenzothiazole, 6-chlorobenzothiazole, 7-chlorobenzothiazole, 6-bromobenzothiazole, 5-iodobenzothiazole, 6-iodobenzothiazole, 4-methylbenzothiazole, 5-methylbenzothiazole, 6-methylbenzothiazole, 5,6-dimethylbenzothiazole, 4-phenylbenzothiazole, 5-phenylbenzothiazole, 6-phenylbenzothiazole, 5-hydroxybenzothiazole, 6-hydroxybenzothiazole, 4-methoxybenzothiazole, 5-methoxybenzothiazole, 6-methoxybenzothiazole, 5-ethoxybenzothiazole, 6-ethoxybenzothiazole, 5,6-dimethoxybenzothiazole, 5,6-methylene-dihydroxybenzothiazole, 5-diethylaminobenzothiazole, 6-diethylaminobenzothiazole, 6-nitrobenzothiazole, 5-carboxybenzothiazole, 5-sulphobenzothiazole, 6-cyanobenzothiazole, 5-trifluoromethylbenzothiazole, 5-benzoylbenzothiazole, tetrahydrobenzothiazole, 7-oxotetrahydrobenzothiazole, benzoselenazole, 5-chlorobenzoselenazole, 5,6-dimethylbenzoselenazole, 5-hydroxybenzoselenazole, 5-methoxybenzoselenazole, tetrahydrobenzoselenazole, benzoxazole, 5-chlorobenzoxazole, 6-chlorobenzoxazole, 5,6-dimethylbenzoxazole, 5-phenylbenzoxazole, 5-hydroxybenzoxazole, 5-methoxybenzoxazole, 5-phenylbenzoxazole, 5-hydroxybenzoxazole, 5-methoxybenzoxazole, 5-ethoxybenzoxazole, 6-dialkylaminobenzoxazole, 5-carboxybenzoxazole, 5-sulphobenzoxazole, sulphonamidobenzoxazole, 5-carboxyvinylbenzoxazole, quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline or 5-oxo-5,6,7,8-tetrahydroquinoline;

$R^1$ or $R^2$ represents a saturated or olefinically unsaturated aliphatic group with preferably up to 5, in particular up to 3 carbon atoms, which group may be substituted in one or more positions, e.g. with halogen such as fluorine, chlorine or bromine, hydroxyl, carboxyl, esterified carboxyl, carbamoyl, sulpho, sulphonamido, sulphato, thiosulphato or phosphoric acid groups;

$R^3$ represents alkyl with preferably up to 3 carbon atoms, cycloalkyl such as cyclopentyl or cyclohexyl or phenyl;

$n = 0$ or 1 and $Z^-$ represents any anion such as chloride, bromide, nitrate, iodide, phosphate, fluoride, perchlorate, acetate, tosylate, sulfate, methylsulfate, oxalate, lactact or benzoate; it may be absent in cases where a molecule already contains an acidic group, so that a betaine is present. Quinoline dyes of the following formula are preferred:

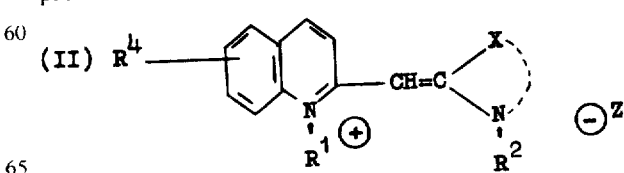

in which $R^1$, $R^2$, X and $Z^\ominus$ have the meanings indicated above and $R^4$ represents (1) a hydrogen, (2) halogen such as fluorine, chlorine, bromine or iodine, (3) alkyl or (4) an alkoxy group both of which preferably contains up to 3 carbon atoms and may be substituted, e.g. with carboxyl, sulfo or halogen.

Meso-substituted cyanine dyes of the following formula are also particularly suitable:

(III) 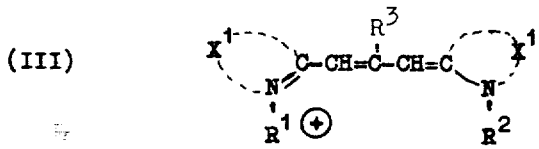  

in which

R$^1$, R$^2$, R$^3$ and Z$^\ominus$ have the meanings indicated above and X$^1$ represents a benzoxazole, benzothiazole or benzoselenazole ring which may be substituted, e.g. those already mentioned above.

The following are examples of suitable compounds:

A 1 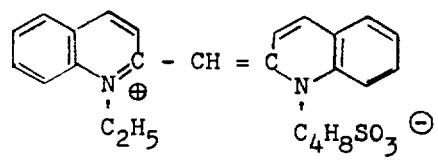

A 2 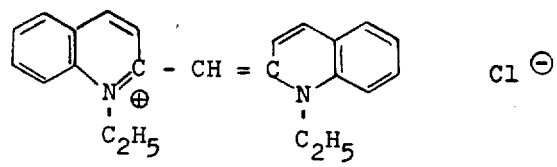

A 3 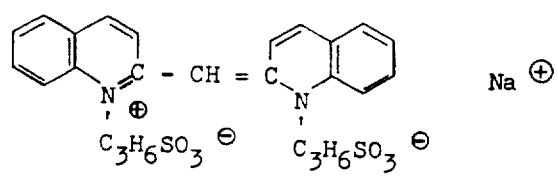

A 4 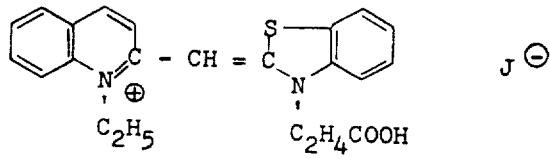

A 5 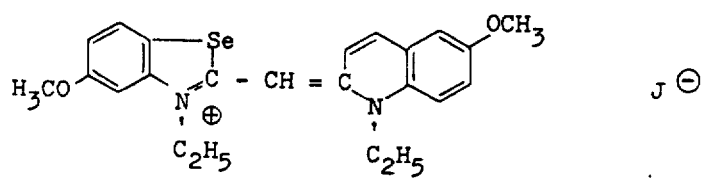

A 6 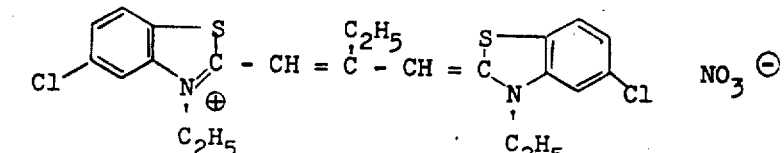

A 7 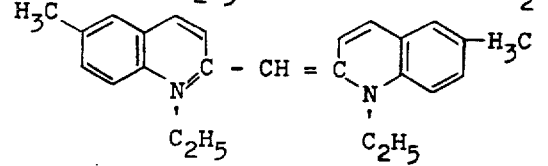

A 8 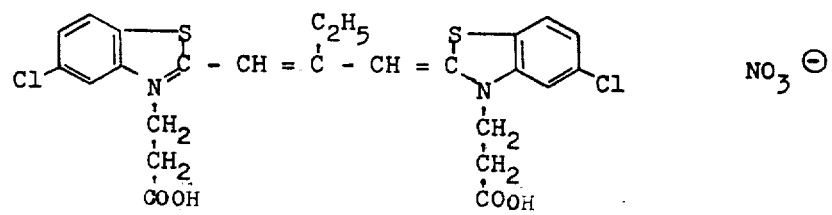

The supersensitizers used are styryl dyes preferably those of the following formula:

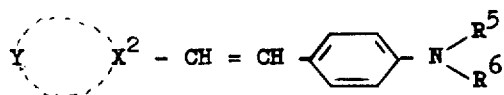

in which

R⁵ or R⁶ represents hydrogen, a saturated or unsaturated aliphatic group with preferably up to 3 carbon atoms or a cycloaliphatic group, e.g. cyclopentyl or cyclohexyl; X² and Y represent the ring members required to complete a nitrogen-containing 5- or 6- membered heterocyclic ring of the kind most commonly found in cyanine chemistry which may also contain condensed benzo or naphtho rings, e.g. ring members based on thiazole (e.g. thiazole, 4-methylthiazole, 5-methylthiazole, 4,5-dimethylthiazole, 4-phenylthiazole, 5-phenylthiazole, or 4,5-diphenylthiazole, benzothiazole (e.g. benzothiazole, 4-chlorobenzothiazole, 5-chlorobenzothiazole, 6-chlorobenzothiazole, 7-chlorobenzothiazole, 6-bromobenzothiazole, 5-iodobenzothiazole, 6-iodobenzothiazole, 4-methylbenzothiazole, 5-methylbenzothiazole, 6-methylbenzothiazole, 5,6-dimethylbenzothiazole, 4-phenylbenzothiazole, 5-phenylbenzothiazole, 6-phenylbenzothiazole, 5-hydroxybenzothiazole, 6-hydroxybenzothiazole, 4-methoxybenzothiazole, 5-methoxybenzothiazole, 6-methoxybenzothiazole, 5-ethoxybenzothiazole, 6-ethoxybenzothiazole, 5,6-dimethoxybenzothiazole, 5,-6-methylen-dihydroxybenzothiazole, 5-diethylaminobenzothiazole, 6-diethylaminobenzothiazole, 6-nitrobenzothiazole, 5-carboxybenzothiazole, 5-sulfobenzothiazole, 6-cyanobenzothiazole, 5-trifluoromethylbenzothiazole, 5-benzoylbenzothiazole, tetrahydrobenzothiazole or 7-oxotetrahydrobenzothiazole, naphthothiazole (e.g. naphtho[1,2-d]thiazole, naphtho-[2,1-d]thiazole, 7-methoxynaphtho[2,1-d]thiazole or 8-methoxynaphtho[2,1-d]thiazole), selenazole (e.g. 4-methylselenazole or 4-phenylselenazole), benzoselenazole (e.g. benzoselenazole, 5-chlorobenzoselenazole, 5,6-dimethylbenzoselenazole, 5-hydroxybenzoselenazole, 5-methoxybenzoselenazole, or tetrahydrobenzoselenazole), naphthoselenazole (e.g. naphtho[1,2-d]selenazole or naphtho[2,1-d]selenazole, oxazole (e.g. oxazole, 4-methyloxazole, 4-phenyloxazole or 4,5-diphenyloxazole), benzoxazole (e.g. benzoxazole, 5-chlorobenzoxazole, 6-chlorobenzoxazole, 5,6-dimethylbenzoxazole, 5-phenylbenzoxazole, 5-hydroxybenzoxazole, 5-methoxybenzoxazole, 5-ethoxybenzoxazole, 6-methoxybenzoxazole, 5-carboxybenzoxazole, 5-dialkylaminobenzoxazole, 5-carboxybenzoxazole, 5-sulfobenzoxazole, sulfonamidebenzoxazole or 5-carboxyvinylbenzoxazole), naphthoxazole (e.g. naphtho[1,2-d]-oxazole, naphtho[2,1-d]oxazole or naphtho[2,3-d]-oxazole), 3,3-dialkylindolenine (e.g. 3,3-dimethylindolenine, 3,3,5-trimethylindolenine or 3,3-dimethyl-5-methoxyindolenine), 2-pyridine (e.g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 3-phenylpyridine, 4-phenylpyridine or 6-phenylpyridine), 4-pyridine (.e.g. 2-methylpyridine, 3-methylpyridine, 2,3-dimethylpyridine, 2,5-dimethylpyridine, 2,6-dimethylpyridine, 2-chloropyridine, 3-chloropyridine, 2-hydroxypyridine, or 3-hydroxypyridine), 2-quinoline (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline or 5-oxo-5,6,7,8-tetrahydroquinoline), 4-quinoline (e.g. quinoline, 6-methoxyquinoline, 7-methylquinoline or 8-methylquinoline), isoquinoline (e.g. isoquinoline or 3,4-dihydroisoquinoline), thiazoline (e.g. thiazoline or 4-methylthiazoline), oxazolone or ring members based on pyrroline, tetrahydropyridine, thiadiazole, oxadiazole, pyrimidine, triazine or benzothiazine, benzotriazole, pyrimidone or thiopyrimidone. The aryl groups and the heterocyclic groups may in turn be substituted in any way desired, e.g. by alkyl groups which preferably have up to 3 carbon atoms such as methyl or ethyl or with halogen such as chlorine or bromine, hydroxyl, alkoxy with preferably up to 3 carbon atoms such as methoxy or ethoxy, hydroxyalkyl, alkylthio, aryl such as phenyl or aralkyl such as benzyl, amino, substituted amino or nitro.

The following are examples of suitable compounds:

B 1 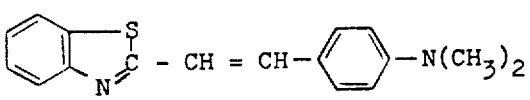

B 2 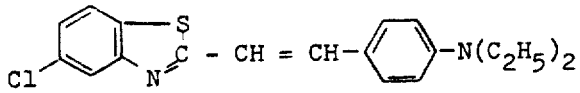

B 3 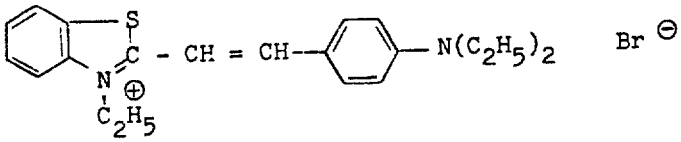

—Continued

B 4 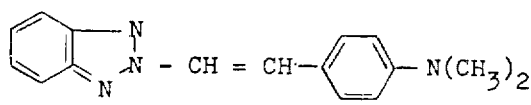

B 5 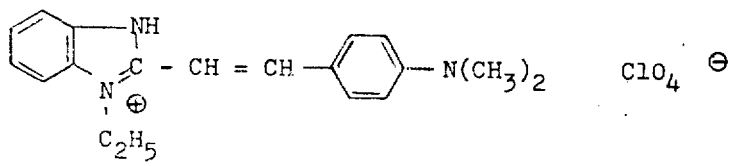

B 6 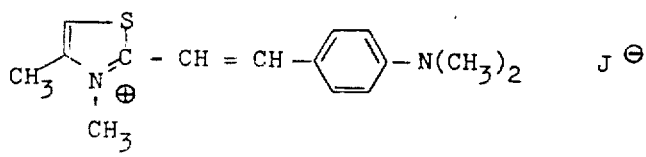

The preparation of the supersensitizable sensitizers is carried out by known methods, e.g. by reacting 2-alkylthio-substituted hererocyclic quaternary salts with 2-methylsubstituted heterocyclic quaternary salts, mercaptans and acids being split off in the process.

Reference may be made to German Pat. Specifications No. 710,748 and 917,330 and to British Pat. Specifications No. 742,112 and 1,253,839. The same applies to styryl dies, the preparation of which has been described in German Pat. Specifications No. 394,744 and 395,666.

The sensitivity enhancing effect of the supersensitizers is particularly surprising in view of the fact that solarization, which is based on the destruction of latent image nuclei by positive holes or photolytically formed halogen, is suppressed by various halogen acceptors or positive hole acceptors. It was therefore to be expected that the destruction of fog nuclei in direct positive emulsions, which is analogous to the process of solarization, would also be suppressed by supersensitizers since these compounds may be regarded as positive hole traps. The exactly opposite effect, however, is produced in this invention.

The fogged direct positive silver salt emulsions preferably contain silver halides, e.g. silver chloride or silver bromide, more preferably silver bromide, optionally with a small proportion of silver iodide which may be up to 10 mols percent. The binders used for the emulsion layer may be the usual hydrophilic film-forming substances such as proteins particularly gelatine, alginic acid or its derivatives such as esters, amides or salts, cellulose derivatives such as carboxymethylcellulose, starch or its derivatives or hydrophilic synthetic binders such as polyvinyl alcohol, partly saponified polyvinyl acetate, or polyvinylpyrrolidone. The hydrophilic binders of the layers may also be mixed with solutions or dispersions of other synthetic binders such as homopolymers or copolymers of acrylic or methacrylic acid or their derivatives such as esters, amides or nitriles or vinyl polymers such as vinyl esters or vinyl ethers.

The fogged silver salt emulsion layers are applied to the usual support layers, e.g. glass or foils of cellulose esters such as cellulose acetate or cellulose acetobutyrate or foils of polyesters, particularly of polyethylene teraphthalate or polycarbonate, especially those based on bisphenylolpropane. Other materials suitable for use as support layers are baryta paper or paper which has been laminated with polyolefins such as polyethylene or polypropylene.

The fogged silver halide emulsions used for the invention preferably have a narrow range of grain sizes; finegrained emulsions are particularly suitable but the invention is not restricted to these types of emulsions, which are described in British Pat. Specification 1,027,146. The grain size distribution is preferably such that at least 90% by weight of the silver halide grains do not deviate from the average grain diameter by more than 40%.

The surface fogging of the silver halide grains in the photographic direct positive emulsions according to the invention is carried out in known manner for example by treating the emulsions with reducing agents, preferably in the presence of water-soluble salts of metals which are more electropositive than silver. Suitable reducing agents are, e.g. tin(II) salts such as tin(II) chloride, hydrazine or hydrazine compounds, sulfur compounds such as thiourea dioxide or phosphonium salts such as tetra(hydroxymethyl)-phosphonium chloride. Suitable compounds of metals which are more electropositive than silver are, for example, the following noble metal salts: Gold salts such as potassium chloroaurate, gold(III) chloride, salts of rhodium, platinum or palladium such as ammonium hexachloropalladate and iridium salts such as potassium chloroiridate. Emulsions of this kind have been described in British Pat. Specification No. 723,019 and in German Offenlegungsschrift No. 1,547,790.

The concentration of the reducing agents or noble metal salts used for fogging may vary within wide limits. It is generally sufficient to use concentrations of 0.05 to 50 mg of reducing agent and 0.1 to 15 mg of the noble metal salts per mol silver salt. If the emulsions have been too heavily fogged, they may subsequently be treated with a bleaching agent in known manner so that the direct positive emulsions can be adjusted to the optimum sensitivity to light.

According to a preferred embodiment of this invention, the fogged direct positive silver halide emulsions used contain ripening nuclei in the interior of the silver halide grain. As described in the publication of E. Moisar and S. Wagner in "Berichte der Bunsengesellschaft fur physikalische Chemie" 67 (1963), 356 – 359, the photoelectrons which are formed in the primary process and prevent destruction of the developable fog nuclei at the surface of the grain are thereby trapped in the interior of the grain. The preparation of such emulsions with a composite grain structure has been described in British Pat. Specification No. 1,027,146 and in German Offenlegungsschrift No. 1,597,488. The formation of ripening nuclei in the interior of the grain is carried out in known manner by chemical sensitization with noble metal compounds, in particular with gold salts or iridium salts or with sulfur compounds such as thiosulfate or a combination of treatment with noble metal salts and sulfur compounds.

The sensitizers which are capable of being supersensitized are present in the usual concentrations in the emulsion. Suitable concentrations are e.g. 50 mg to 2 g, preferably 0.1 to 0.5 g, per mol of silver salt. The concentration of supersensitizing styryl compound is 5 to 20 mols percent, based on the quantity of sensitizing dye used. The addition of sensitizers or supersensitizers to the direct positive emulsions is carried out in the same way as the addition to negative emulsions, preferably shortly before the emulsions are cast from alcoholic or aqueous solutions.

Other direct positive emulsions which are suitable for this invention have been described in German Pat. Specifications No. 606,392 and 642,222 and in British Pat. Specifications No. 581,773 and 655,009. The emulsions may also contain mercury salts or thallium salts as described in U.S. Pat. Specification No. 3,620,750.

The emulsions may contain the usual stabilizers such as, for example, homopolar or salt-type compounds of mercury which contain aromatic or heterocyclic rings (for example mercapto triazoles), simple mercury salts, sulfonium mercury double salts and other mercury compounds. Azaindenes are also suitable stabilizers, especially tetra- or pentaazaindenes and particularly those which are substituted with hydroxyl or amino groups. Compounds of this kind have been described in the article by Birr, Z.Wiss.Phot. 47 2 – 58 (1952). Other suitable stabilizers include heterocyclic mercapto compounds, e.g. phenylmercaptotetrazole, quaternary benzothiazole derivatives, or benzotriazole.

The emulsions may be hardened in the usual manner, for example with formaldehyde or halogenated aldehydes which contain a carboxyl group, such as mucobromic acid, diketones, methane sulphonic acid esters or dialdehydes.

The emulsions according to the invention may also contain the usual color couplers which yield image dyes by reacting with the oxidation products of colour forming developers, in particular those of the p-phenylenediamine series. The usual color couplers are suitable for this purpose, e.g. pyrazolone couplers or couplers of the naphthol series or the benzoyl acetanilide series. The color couplers may be added to the emulsion layers in the form of solutions or dispersions in known manner. The emulsions according to the invention may also contain dyes which are attached to a developer molecule and which are capable of diffusing imagewise into a receptor layer from the exposed and therefore non-developable image areas. The dyes may also be in the form of diffusion resistant compounds from which they are liberated by the product of oxidation of the developer so that they can diffuse into an image receptor layer. Lastly, the emulsions may contain dyes which are destroyed imagewise in the developed, i.e. exposed areas by reduction in a bleaching process following development. These dyes are preferably azo dyes.

Example 1

Preparation of the emulsion:

1800 ml of 3N silver nitrate solution and 1800 ml of 3N potassium bromide solution are introduced into 1500 ml of a 5% gelatine solution by means of dosing pumps at the rate of 800 ml/hour each at 60°C. Precipitation is stopped when 20% of the total quantity of the two solutions has been added to the gelatine solution. After the addition of 5 ml of a $10^{-1}$ molar solution of $Na_3[Au(S_2O_3)_2]$, the mixture is digested for 30 minutes at 60°C and thereafter precipitation is completed. The emulsion is solidified after the addition of 120 g of gelatine and then washed in the usual manner.

After washing, the resulting silver halide emulsion, which contains ripening nuclei in the interior of its grains, is fogged by treating it for one hour at 50°C with 15 cc of a 0.1% aqueous solution of gold(III) chloride and 0.3 g of hydrazine hydrate per mol of silver halide.

The emulsion has a very narrow range of grain sizes. The length of the edge of the cubical silver halide grains is 0.35 μm. The emulsion is subsequently diluted to a concentration of about 20 g of silver bromide and 50 g of gelatine per litre with gelatine solution.

This diluted emulsion is divided into several portions or individual samples and to each sample there are added, in addition to the usual hardeners and wetting agents, 0.35 g of a supersensitizable sensitizer per mol of silver bromide and, in some cases, 0.035 g of supersensitizing additive per mol of silver bromide. The emulsions are then cast on a cellulose acetate support layer and exposed behind a spectral wedge. They are then developed with a p-methylaminophenol-hydroquinone developer for 5 minutes at 18°C.

The substances added to the individual samples are summarized in the table below.

| Sample | Supersensitizable sensitizer | Supersensitizing additives |
|---|---|---|
| 1 | A 1 | — |
| 2 | A 1 | B 1 |
| 3 | A 1 | B 4 |
| 4 | A 1 | B 6 |
| 5 | A 2 | — |
| 6 | A 2 | B 2 |
| 7 | A 3 | — |
| 8 | A 3 | B 2 |
| 9 | A 3 | B 3 |
| 10 | A 4 | — |
| 11 | A 4 | B 5 |
| 12 | A 5 | — |
| 13 | A 5 | B 1 |
| 14 | A 6 | — |
| 15 | A 6 | B 1 |
| 16 | A 7 | — |
| 17 | A 7 | B 2 |
| 18 | A 8 | — |
| 19 | A 8 | B 1 |

The results of the sensitomeric determinations are represented in the attached FIGS. 1 to 19. These figures show the relationship between sensitivity and the wavelength of light. They clearly demonstrate the supersensitizing effect.

Example 2

A silver iodobromide emulsion was prepared as described in the first paragraph of Example 1, but after preparation of the internal nuclei which act as electron traps, a shell of AgBr/I was precipitated by running in simultaneously a solution of AgNO₃ and a solution of KBr containing 3 mols percent of KI. Subsequent treatment was the same as that described in paragraph 1 of Example 1.

500 ml portions of the fogged emulsion described above were treated with a quantity of sensitizer corresponding to 0.35 g of dye per mol of AgBr/I, either alone or together with a supersensitizer in an amount of 0.035 g per mol of AgBr/I. The sensitizers and supersensitizers used are shown in the table below. Subsequent treatment was the same as described in Example 1. The spectrograms represented in FIGS. 20 to 23 demonstrate the sensitivity increasing influence of the supersensitizer.

| Sample | Supersensitizable sensitizer | Supersensitizing additive |
|---|---|---|
| 20 | A 1 | — |
| 21 | A 1 | B 1 |
| 22 | A 4 | — |
| 23 | A 4 | B 5 |

Example 3

Each 500 g portion of the emulsion prepared according to Example 1 was sensitized with 0.35 g of sensitizer A 1 / mol of AgBr. In addition, 4.5 g of a 3-acylamino-1-phenyl-pyrazolone coupler were added to the emulsion as magenta coupler.

Figure 24:
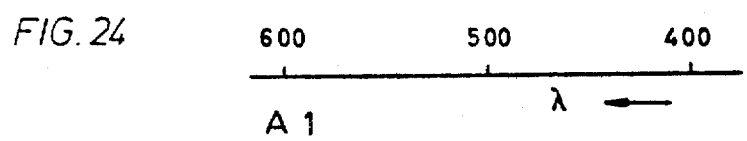
Figure 25:
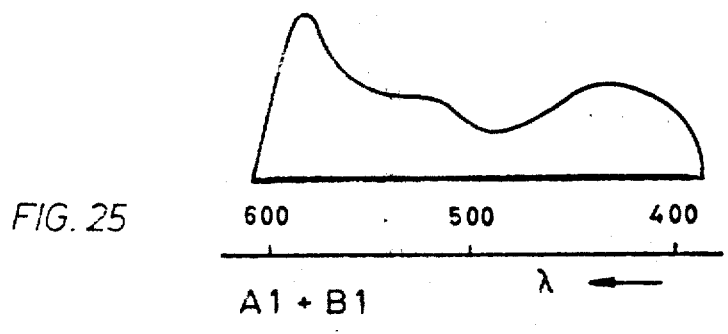

0.035 g of B 1 / mol of AgBr was added to one 500 g portion of the above emulsion before the addition of the colour coupler. After exposure behind a spectral wedge, the emulsions were developed in a conventional colour developer. The spectrograms in FIGS. 24 and 25 demonstrate the sensitivity increasing effect of the supersensitizer.

We claim:

1. A photographic direct-positive material containing at least one direct-positive fogged silver halide emulsion layer, the silver halide grains of said emulsion layer contain electron traps, the said emulsion containing a super-sensitizing combination comprising a symmetrical or unsymmetrical cyanine dye of the following formula:

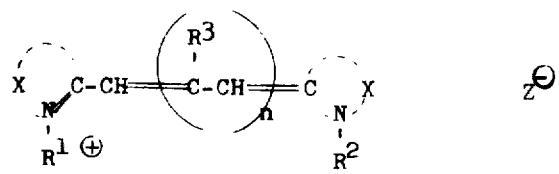

in which

X = the ring members required for completing a benzooxazole, benzothiazole, benzoselenazole or quinoline ring;

R¹ or R² = a saturated or olefinically unsaturated aliphatic group;

R³ = alkyl with up to 3 carbon atoms, cycloalkyl or phenyl;

n = 0 or 1;

Z⁻ = any inorganic or organic anion; and a supersensitizing styryl compound of the following formula:

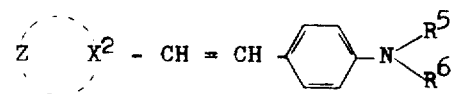

in which

R⁵ and R⁶ = hydrogen, a saturated or unsaturated aliphatic group or a cycloaliphatic group;

X² and Z = the ring members required for completing a heterocyclic ring selected from the class consisting of thiazole, benzothiazole, naphthothiazole, selenazole, benzoselenazole, naphthoselenazole, oxazole, benzoxazole, naphthoxazole, 3,3-dialkylindolenine, 2-pyrridine, 4-pyrridine, 2-quinoline, 4-quinoline, isoquinoline, diazoline, oxazolone, pyrroline, tetrahydropyridine, thiadiazole, oxadiazole, pyrimidine, triazine, benzothiazine, benzotriazole, pyrimidone, thiopyrimidone, and benzimidazole.

2. The photographic material of claim 1, wherein the cyanine dye has the following formula:

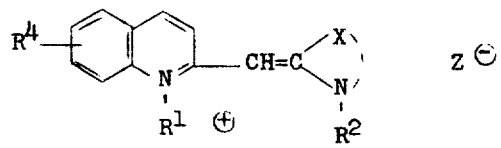

in which

X = the ring members required for completing a benzoxazole, benzothiazole, benzoselenazole or quinoline ring;

R¹ or R² = a saturated or olefinically unsaturated aliphatic group;

R⁴ = (1) hydrogen, (2) halogen, (3) alkyl or (4) alkoxy;

Z⁻ = any inorganic or organic anion.

3. The photographic material of claim 1, wherein n stands for 1 and X represents a benzoxazole, benzothiazole or benzoselenazole ring.

4. The photographic material of claim 1, wherein the grains of the direct positive silver salt emulsion contain internal ripening specks.

* * * * *